United States Patent Office 3,231,519
Patented Jan. 25, 1966

3,231,519
CATALYST COMPOSITION CONSISTING ESSENTIALLY OF THE OXIDES OF IRON, RARE EARTH AND ZIRCONIUM
Jared W. Clark, Charleston, and Charles E. Rectenwald, South Charleston, W. Va., assignors to Union Carbide Corporation, a corporation of New York
No Drawing. Filed July 25, 1961, Ser. No. 126,524
3 Claims. (Cl. 252—462)

This invention relates to novel halogen exchange catalysts and to methods for their preparation. In a particular aspect, this invention relates to fluorination catalysts which minimize disproportionation reactions.

A variety of halogen exchange catalysts are known and used in the art for introducing fluorine into organic compounds or increasing the fluorine content of halocarbons. Among the best catalysts for these applications are chromium fluorination catalysts such as chromium oxide on alumina. These catalysts are highly active in halogen exchange reactions and provide high conversion of chlorocarbons to chlorofluorocarbons and fluorocarbons. Hence, chloroform is conveniently converted to chlorodifluoromethane, and carbon tetrachloride is converted to dichlorodifluoromethane, by contacting a vapor phase mixture of the starting material and hydrogen fluoride with chromium fluorination catalyst.

It has been found that chromium catalysts which are active in halogen exchange reactions are also active in disproportionation reactions. In many instances this is a disadvantage since it diminishes the yield of the product being sought and increases the yield of other products which may be difficult to separate from the desired product. For example, in the vapor phase fluorination of chloroform over chromium catalysts, it is virtually impossible to obtain high conversions of chlorodifluoromethane without producing significant quantities of trifluoromethane. Likewise, fluorination of carbon tetrachloride over chromium catalysts produces significant amounts of chlorotrifluoromethane at the expense of the valuable dichlorodifluoromethane product.

Accordingly, it is an main object of the present invention to provide catalysts which are highly active in promoting halogen exchange reactions but which have low activity in promoting disproportionation interaction of halocarbons.

It is another object of the present invention to provide halogen exchange catalysts which are stable to repeated reactivation by treatment with air or oxygen.

It is another object of the present invention to provide halogen exchange catalysts which have superior mechanical properties.

Other objects and advantages of the present invention will become apparent to those skilled in the art from the accompanying description and disclosure.

One or more objects of the present invention are accomplished by the provision of catalysts which are produced by the coprecipitation of metal oxides comprising (1) iron oxide, and (2) rare earth oxides.

The catalysts are conveniently coprecipitated by combining aqueous solutions of the respective component salts and treating the mixture with a base such as ammonium hydroxide in order to cause precipitation of the catalyst components in the form of hydrous oxides. The particular salts of the respective metals which can be employed for the catalyst preparation can be any of those salts which convert to the hydrous oxides in a convenient manner when treated with ammonium hydroxide or any other such alkaline reagent. Usually the chloride and nitrate salts provide satisfactory results. The nitrate salts are particularly preferred since any trace amounts of nitrate which remain occluded in the coprecipitation process can be decomposed by heating at an elevated temperature.

The same catalysts can also be prepared by precipitating each metal oxide component individually in a separate aqueous medium, then recovering each precipitate and admixing them together while they are still in a hydrated gelatinous form.

The iron oxide component contemplated to be employed is ferric oxide. The rare earth oxides contemplated to be employed are those derived from the rare earth metals corresponding to the metals having atomic numbers ranging between fifty-seven and seventy-one, inclusive. The term "rare earth oxide" is also meant to include yttrium oxide. Yttrium has an atomic number of thirty-nine, but it has properties similar to the rare earth metals and is usually found in admixture with the rare earths in the natural state.

The ratio of iron oxide to rare earth oxide in the coprecipitated catalysts can vary over a broad range. Catalysts having activity in halogen exchange reactions but having little or no activity in halocarbon disproportionation reactions can be prepared employing iron oxide and between 1 and 50 percent by weight of rare earth oxide based on the weight of the iron oxide. The particularly preferred catalysts of the present invention which have excellent activity as halogen exchange catalysts and which have good mechanical strength are those which contain between about 5 and 30 percent by weight of rare earth oxide based on the weight of iron oxide in the catalyst.

The rare earth oxide component can be employed either as a single component such as, for example, lanthanum oxide, or more conveniently, it can be used as a mixture of rare earth oxides which is its usual form. Illustrative of a rare earth oxide mixture is didymium oxide. The term "didymium" applies to commercial mixtures of rare earth elements obtained from monazite sand by extraction followed by the elimination of cerium and thorium from the mixture. The term is used like that of an element in naming mixed oxides and salts. The approximate composition of didymium from monazite, expressed as rare earth oxides, is 45.5 percent lanthana ($La_2O_3$), 11 percent praseodymia ($Pr_6O_{11}$), 32 to 33 percent neodymia ($Nd_2O_3$), 5 to 6 percent samaria ($Sm_2O_3$), 3 to 4 percent gadolinia ($Gd_2O_3$), 0.4 percent yttrium earth oxide ($Y_2O_3$), 1 to 2 percent of other oxides. The term "didymium" has also been applied to mixtures of praseodymium and neodymium since such mixtures were once thought to be an element and assigned the symbol Di.

The catalysts of the present invention can contain other oxides in addition to iron oxide and rare earth oxides. The activity of the catalysts and the physical properties can be varied as desired by including metal oxides such as manganese oxide, thorium oxide, zirconium oxide and the like. The inclusion of zirconium oxide in the coprecipitated catalysts is particularly advantageous in that these catalysts exhibit high activity in halogen exchange reactions and have good mechanical strength and other desirable physical properties. The addition of one or more metal oxides as a component in the coprecipitated iron oxide-rare earth oxide catalysts can be in a quantity between about 2 and 20 percent by weight, based on the total weight of iron oxide and rare earth oxide components.

In another aspect of the present invention, the catalysts can be employed on a supporting material such as alumina or activated carbon. Such catalysts can be produced by impregnating the support material with the nitrate salts of the respective iron and rare earth metals, and then recovering the impregnated support material and roasting it at elevated temperatures such as 400° C.

An alternative method is to precipitate chloride or nitrate salts of the respective metals onto the support by means of ammonium hydroxide and then drying the supported catalyst mass.

When the catalysts are to be employed in halogen exchange reactions, it has been found advantageous to pretreat the catalyst with hydrogen fluoride. This is readily accomplished by charging the catalysts to a reactor and passing a stream of hydrogen fluoride over the catalysts for periods ranging from one to two hours or more. The pretreatment of the catalysts in this manner has been found to permit better reaction temperature control when the catalysts are employed in a vapor phase halogen exchange reaction.

The catalysts of the present invention which comprise coprecipitated mixtures of iron oxide and rare earth oxides are more active as halogen exchange catalysts than the respective components taken individually.

The catalysts of the present invention are valuable for promoting halogen exchange reactions, particularly when it is desirable to suppress disproportionation side reactions. The catalysts differ from other halogen exchange catalysts such as chromium catalysts in that these other catalysts are highly active in promoting disproportionation reactions. For example, by using a catalyst of the present invention, such as coprecipitated iron oxide and didymium oxide, it is possible to convert chloroform to chlorodifluoromethane in yields as high as 50 percent or higher with little or no production of disproportionation reaction products such as trifluoromethane; and it is possible to convert carbon tetrachloride to dichlorodifluoromethane in high yields with little or no production of disproportionation reaction products such as chlorotrifluoromethane. By the use of chromium catalysts, or other similar catalysts known and used in the art, the production of disproportionation products is high and may even exceed the yield of material produced by halogen exchange.

The catalysts of the present invention have general application as halogen exchange catalysts with organic compounds such as halocarbons which have a carbon content between one and about four carbon atoms. Hence, compounds such as chloroform, bromoform, carbon tetrachloride, chlorofluoromethane, trichloroethane and trichlorotrifluoroethane, 2,2-dichloropropne, and the like, can be employed.

The following examples will serve to illustrate specific embodiments of the invention.

EXAMPLE 1

This example illustrates the prepartion of a coprecipitated iron oxide-cerium oxide catalyst, and the use of the catalyst in a fluoroination process.

A solution was prepared by dissolving 760 grams of ferric nitrate and 188 grams of cerium nitrate $$[Ce(NO_3)_3 \cdot 6H_2O]$$

in 1560 milliliters of distilled water. A second solution was prepared by diluting 450 milliliters of ammonium hydroxide (28 percent $NH_3$) to 4.52 liters with water.

Over a thirty-five minute period, the two solutions were fed simultaneously into 10 liters of water with vigorous agitation. The feed rates were adjusted to maintain the pH of the resulting slurry between 8.5 and 9.5. The slurry was filtered and the filter cake was washed two times by dispersing in 10 liter portions of water and refiltering. After the final filtration the filter cake was stirred with one liter of water to form a mobile paste. This mixture was poured into a shallow pan and dried for a period of sixteen hours at a temperature of 130° C. After the drying period, the gel was granular and 184 grams of 4 x 10 mesh material occupied a volume of 185 milliliters.

A 150 milliliter sample of the catalyst was placed in a one inch I.D. by 48 inch nickel pipe reactor, heated in a molten salt bath. Carbon tetrachoride (1.11 moles/hour) and hydrogen fluoride (2.48 moles/hour) were vaporized over the catalyst at a temperature of 250° C. The reaction product stream was scrubbed with water, dried over calcium chloride and condensed and collected in cold traps. The recovered product mixture had the following percentage composition:

| | |
|---|---|
| $CClF_3$ | 0.8 |
| $CCl_2F_2$ | 94.8 |
| $CCl_3F$ | 4.2 |
| $CCl_4$ | 0.2 |

EXAMPLE 2

This example illustrates the preparation of coprecipitated iron oxide-didymium oxide catalyst, and the use of this catalyst in a fluorination process.

A solution was prepared by dissolving 1215 grams of ferric nitrate [$Fe(NO_3) \cdot 9H_2O$] and 300 grams of didymium nitrate [$Di(NO_3)_3 \cdot 6H_2O$][1] in 2.5 liters of water. A second solution was prepared by diluting 1335 milliliters of ammonium hydroxide (28 percent $NH_3$) to 8 liters with distilled water. The two solutions were fed simultaneously into a stainless steel kettle containing 16 liters of distilled water over a period of sixty-five minutes with vigorous agitation. The feed rates were adjusted to maintain the pH of the resulting slurry between 9 and 9.5. The slurry was filtered and the filter cake washed twice by dispersing in water and refiltering. The filter cake was dried at a temperature of 130° C. The resulting dry gel was granular and 359 grams of 4 x 10 mesh material occupied a volume of 310 milliliters.

The catalyst (150 milliliters) was placed in a one inch I.D. by 48 inch nickel pipe reactor heated by molten salt bath. Carbon tetrachloride (1.15 moles/hour) and hydrogen fluoride (2.3 moles/hour) were vaporized over the catalyst at a temperature of 250° C. The reaction product stream was scrubbed with water, dried over calcium chloride and condensed and collected in cold traps. The product mixture had the following percentage composition:

| | |
|---|---|
| $CClF_3$ | 0.7 |
| $CCl_2F_2$ | 88.5 |
| $CCl_3F$ | 9.0 |
| $CCl_4$ | 0.8 |

EXAMPLE 3

This example illustrates the preparation of coprecipitated iron oxide-rare earth oxide catalyst, and the use of the catalyst in a fluorination process.

A solution was prepared by dissolving 760 grams of ferric nitrate and 188 grams of rare earth nitrate [2] in in 1560 milliliters of water. A second solution was prepared by diluting 800 milliliters of ammonium hydroxide (28 percent $NH_3$) to 4780 milliliters with water.

The solutions were fed simultaneously into a vessel containing 10 liters of water with vigorous agitation over a fifty-three minute addition period. The feed rates were adjusted to maintain the pH of the resulting slurry between 8.5 and 9.5. The slurry was filtered and the filter cake was washed in the manner previously described. The final filter cake was stirred with one liter of water to produce a mobile paste. This mixture was poured into a shallow pan and dried for sixteen hours at a temperature of 130° C. 216 grams of the resulting granular gel occupied a volume of 195 milliliters.

The catalyst (155 milliliters) was placed in a nickel pipe reactor, and carbon tetrachloride (1.25 moles) and hydrogen fluoride (2.5 moles) were vaporized over the catalyst at a temperature of 250° C. to 265° C. for a contact time of 3.4 seconds. The product mixture which

---

[1] Lindsay Chemical Division of American Potash.
[2] Lindsay Chemical Division of American Potash.

was condensed and recovered had the following percentage composition:

| | |
|---|---|
| $CClF_3$ | 0.1 |
| $CCl_2F_2$ | 87.7 |
| $CCl_3F$ | 9.4 |
| $CCl_4$ | 2.9 |

EXAMPLE 4

This example illustrates the preparation of a coprecipitated iron oxide-zirconium oxide-didymium oxide catalyst, and the use of the catalyst in a fluorination process.

A solution was prepared by dissolving 810 grams of ferric nitrate, 375 grams of zirconyl nitrate and 300 grams of didymium nitrate in 2500 milliliters of water. A second solution was prepared by diluting 980 milliliters of ammonium hydroxide (28 percent $NH_3$) to 5900 milliliters with water. The two solutions were fed simultaneously with vigorous agitation into a vessel containing 16 liters of water over a one-hour addition period. The feed rates were adjusted to maintain the pH of the resulting slurry between 8.5 and 9.5. The slurry was filtered and the filter cake was washed in the manner described hereinabove. The final filter cake was then stirred with 2 liters of water, poured into shallow pans and dried for sixteen hours at a temperature of 130° C. A granular gel was obtained, and 442 grams of the material occupied a volume of 385 milliliters.

The catalyst (135 milliliters) was placed in a nickel pipe reactor and carbon tetrachloride (1.19 moles/hour) and hydrogen fluoride (2.40 moles/hour) were vaporized over the catalyst at a temperature of 250° C. for a contact time of 3.2 seconds. The product mixture which was condensed and recovered had the following percentage composition:

| | |
|---|---|
| $CClF_3$ | 0.0 |
| $CCl_2F_2$ | 94.9 |
| $CCl_3F$ | 4.3 |
| $CCl_4$ | 0.8 |

EXAMPLE 5

A solution was prepared by dissolving 1215 grams of ferric nitrate, 188 grams of zirconyl nitrate and 150 grams of didymium nitrate in 2500 milliliters of water. A second solution was prepared by diluting 1100 milliliters of ammonium hydroxide (28 percent $NH_3$) in 6600 milliliters of water. The solutions were fed simultaneously with vigorous agitation into a vessel containing 16 liters of water over a one and one-half hour addition period. A filter cake was recovered, washer and dried for sixteen hours at a temperature of 60° C. It was further dried for twenty-four hours at a temperature of 130° C. A granular gel was obtained, and 347 grams of 4 x 10 mesh material occupied a volume of 290 milliliters.

The catalyst was employed for the fluorination of chloroform, dichloromethane and chloroethanes. After each of the fluorinations, the catalyst was reactivated by oxidation with air.

Fluorination of 1,1,1-trichloroethane

Hydrogen fluoride (177 grams) and 1,1,1-trichloroethane (541 grams) were vaporized over 150 milliliters of the catalyst over a three-hour reaction period at a temperature of 230° C. to 260° C. The product stream was passed through a water scrubber, a calcium chloride tower and was condensed and collected in refrigerated traps. Distillation of the resulting condensate yielded 122 grams of 1,1,1-trifluoroethane (boiling point −47° C.), 33 grams of 1-chloro-1,1-difluoroethane (boiling point −10° C.), 157 grams of 1,1-dichloroethylene (boiling point 32° C.), and a small amount of 1-chloro-1-fluoroethylene (boiling point −25° C.).

Fluorination of 1,1-dichloroethane

Hydrogen fluoride (208 grams) and 1,1-dichloroethane (340 grams) were vaporized over 150 milliliters of the catalyst at a temperature of 240° C. to 250° C. over a 3.25 hour reaction period. Distillation of the recovered condensate product mixture yielded 44 grams of 1,1-difluoroethane (boiling point −25° C.), 5 grams of vinyl fluoride (boiling point −72° C.) and 101 grams of vinyl chloride (boiling point −14° C.).

Fluorination of 1,2-dichloroethane

Hydrogen fluoride (144 grams) and 1,2-dichloroethane (240 grams) were vaporized over 150 milliliters of the catalyst at a temperature of 370° C. to 375° C. over a 3.5 hour reaction period. Analysis of the condensed reaction mixture indicated the presence of 3.4 percent 1,1-difluoroethane, 18.6 percent vinyl fluoride and 75 percent vinyl chloride.

Fluorination of dichloromethane

Hydrogen fluoride (326 grams) and dichloromethane (505 grams) were vaporized over 150 milliliters of the catalyst at a temperature of 345° C. to 350° C. over a seven and one-half hour reaction period. Distillation of the condensed reaction product mixture yielded difluoromethane, chlorofluoromethane and unreacted dichloromethane.

Fluorination of 1,1,2-trichlorotrifluoroethane

Hydrogen fluoride (128 grams) and trichlorotrifluoroethane (461 grams) were vaporized over 150 milliliters of the catalyst at a temperature of 500° C. over a 2.5 hour reaction period. Distillation of the condensed product mixture yielded 105 grams of dichlorotetrafluoroethane (73%, $CClF_2CClF_2$; 27%, $CCl_2FCF_3$) (boiling point 4° C.) and 295 grams of recovered trichlorotrifluoroethane.

EXAMPLE 6

A solution was prepared by dissolving 1215 grams of ferric nitrate, 94 grams of zirconyl nitrate and 75 grams of didymium nitrate in 2500 milliliters of water. A second solution was prepared by diluting 1110 milliliters of ammonium hydroxide (28 percent $NH_3$) to 6670 milliliters with water. The two solutions were fed simultaneously into 16 liters of water during a 1.25 hour addition period, and in the manner previously described, a filter cake was recovered and then stirred with two liters of water to form a mobile paste which was poured into shallow pans and dried. A 278 gram sample of 4 x 10 mesh material occupied a volume of 255 milliliters.

The catalyst (145 milliliters) was placed in a nickel pipe reactor and carbon tetrachloride (1.38 moles/hour) and hydrogen fluoride (2.68 moles/hour) were vaporized over the catalyst at a temperature of 250° C. to 265° C. with a contact time of three seconds. The recovered product mixture had the following percentage composition:

| | |
|---|---|
| $CClF_3$ | 0.5 |
| $CCl_2F_2$ | 85.5 |
| $CCl_3F$ | 12.3 |
| $CCl_4$ | 1.7 |

EXAMPLE 7

Precipitation of hydrous iron oxide

A solution of ferric nitrate (A) was prepared by dissolving 1420 grams of $Fe(NO_3)_3 \cdot 9H_2O$ in 2 liters of water. A solution of ammonium hydroxide (B) was prepared by diluting 966 milliliters of 28 percent ammonia solution with 4834 milliliters of water. Solutions A and B were fed simultaneously into 14.5 liters of water with vigorous agitation during a fifteen minute period. The resulting slurry of hydrous iron oxide was divided into two equal portions.

Precipitation of hydrous didymium oxides

A solution of didymium nitrate (A) was prepared by dissolving 186 grams of $Di(NO_3)_3 \cdot 6H_2O$ in 500 milliliters of water. A solution of ammonium hydroxide (B) was prepared by diluting 150 milliliters of 28 percent ammonia with 750 milliliters of water. Solutions A and B were fed simultaneously into 2.5 liters of water with vigorous agitation during a five minute period. The resulting slurry of hydrous didymium oxide was divided into two equal portions.

*Mixing of hydrous iron oxide and hydrous didymium oxide*

One-half of the iron oxide slurry was mixed with half of the didymium oxide slurry and the mixture was filtered. The resulting filter cake was washed two times by dispersing in 8 liters of water and filtering. The final filter cake was stirred with one liter of water to produce a thick paste. The paste was transferred to shallow pans and was dried for sixteen hours in a 130° C. oven. After drying a granular gel was obtained and 186 grams of 4 x 10 mesh material occupied a volume of 160 milliliters.

*Fluorination of carbon tetrachloride over a mixture of hydrous iron and didymium oxides*

A 150 milliliter sample of the above catalyst was placed in a one-inch I.D. by 48 inch nickel pipe reactor, heated in a molten salt bath. The catalyst was treated with hydrogen fluoride (250° C.) for about one hour. Carbon tetrachloride (1.09 moles/hour) and hydrogen fluoride (2.15 moles/hour) were vaporized over the catalyst at 250° C. to 260° C. The reaction products were scrubbed with water, dried over calcium chloride and collected in refrigerated traps. Gas chromatographic analysis of a one-hour product sample (121 grams) indicated the following composition:

| | |
|---|---|
| $CClF_3$ | 0.4 |
| $CCl_2F_2$ | 89.2 |
| $CCl_3F$ | 10.0 |
| $CCl_4$ | 0.4 |

What is claimed is:

1. A catalyst composition consisting essentially of iron oxide, from about 1 to about 50 weight percent of a rare earth oxide based on the weight of said iron oxide and from about 2 to about 20 weight percent of zirconium oxide based on the combined weight of said iron oxide and rare earth oxide.

2. A catalyst composition consisting essentially of iron oxide, from about 1 to about 50 weight percent of didymium oxide based on the weight of said iron oxide and from about 2 to about 20 weight percent of zirconium oxide based on the combined weight of said iron oxide and didymium oxide.

3. A process for preparing a fluorination catalyst which comprises treating an aqueous solution of salts of iron, zirconium and rare earth metals with ammonium hydroxide to cause coprecipitation of the metals in the form of hydrous oxides, the amounts of said aqueous solutions being so selected that the resulting pH is between about 8.5 and about 9.5 and the resulting hydrous oxide contains from about 1 to about 50 weight percent of rare earth oxide based on the weight of said iron oxide and from about 2 to about 20 weight percent zirconium oxide based on the combined weight of said iron oxide and rare earth oxide, separating the hydrous oxide coprecipitate from the aqueous medium and drying said hydrous oxide coprecipitate.

References Cited by the Examiner
UNITED STATES PATENTS

| | | | |
|---|---|---|---|
| 1,207,706 | 12/1916 | Bosch et al. | 252—462 |
| 2,744,148 | 5/1956 | Ruh et al. | 260—653.7 |
| 2,860,172 | 11/1958 | Woolf | 260—653.7 |
| 2,946,827 | 7/1960 | Belf | 260—653.7 |
| 3,024,199 | 3/1962 | Pasfield | 252—462 |
| 3,086,064 | 4/1963 | Cohen | 260—653.4 X |
| 3,147,078 | 9/1964 | Magee | 23—204 |

MAURICE A. BRINDISI, *Primary Examiner.*

JULIUS GREENWALD, *Examiner.*